United States Patent
Itoh et al.

(10) Patent No.: US 7,183,755 B2
(45) Date of Patent: Feb. 27, 2007

(54) CONSTANT-VOLTAGE POWER CIRCUIT WITH FOLD BACK CURRENT LIMITING CAPABILITY

(75) Inventors: Kohzoh Itoh, Hyogo-ken (JP); Shunsei Tanaka, Osaka-fu (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/402,921

(22) Filed: Apr. 13, 2006

(65) Prior Publication Data
US 2006/0250740 A1    Nov. 9, 2006

(30) Foreign Application Priority Data
Apr. 28, 2005    (JP) .............................. 2005-132446

(51) Int. Cl.
*G05F 1/573* (2006.01)
(52) U.S. Cl. ...................................... 323/274; 323/277
(58) Field of Classification Search ................ 323/272, 323/274, 276, 277, 282, 284; 361/93.1, 93.9
See application file for complete search history.

(56) References Cited

U.S. PATENT DOCUMENTS 5,786,970 A * 7/1998 Nao et al. ...................... 361/18
6,822,428 B2 * 11/2004 Miyanaga et al. ........... 323/284
6,897,638 B2 * 5/2005 Miyanaga et al. ........... 323/274
7,071,667 B2 * 7/2006 Itohara ......................... 323/284

FOREIGN PATENT DOCUMENTS

JP    2004-118411 A    4/2004

* cited by examiner

*Primary Examiner*—Adolf Berhane
(74) *Attorney, Agent, or Firm*—Dickstein Shapiro LLP

(57) ABSTRACT

A constant-voltage power circuit incorporating an overcurrent protection circuit having a fold back current limiting capability operative through low input voltages, and being capable of arbitrarily setting current outputs. The constant-voltage power supply circuit is configured so that a voltage output with small amplitude from a differential amplifier circuit is subjected to amplitude expansion to be amplified to range fully from the ground potential approximately to the input voltage by means of an amplitude expansion circuit, which includes an inverter consisting of an NMOS transistor and a resistor, and that the voltage resulting from the amplitude expansion is subsequently input to the gate of a PMOS transistor configured to directly control an output transistor.

8 Claims, 4 Drawing Sheets

CONSTANT-VOLTAGE POWER CIRCUIT WITH FOLD BACK CURRENT LIMITING CAPABILITY

This application claims priority to Japanese Patent Application No. 2005-132446, filed with the Japanese Patent Office on Apr. 28, 2005, the entire contents of which are hereby incorporated by reference.

FIELD OF INVENTION

The invention generally relates to constant-voltage power circuits, and more specifically to a constant-voltage power circuit incorporating an over-current protection circuit having a fold back current limiting capability operative through low input voltages.

BACKGROUND OF INVENTION

In order to implement overcurrent protection for constant-voltage power supply circuits employing series regulators, overcurrent protection circuits have been widely used such as, for example, a current limiting circuit configured to prevent a current output from exceeding a predetermined current, and an overcurrent protection circuit configured to limit a current output under short circuit conditions.

The overcurrent protection circuit is characterized by the so-called fold back current limiting capability, which provides better protection than conventional current limiting because as a load resistance decreases below a predetermined value, both the voltage and current decrease simultaneously along a characteristic foldback locus.

FIG. 3 is a diagrammatic circuit diagram illustrating a known constant-voltage power supply circuit incorporating an overcurrent protection circuit.

Referring to FIG. 3, the known constant-voltage power supply circuit 100 includes a constant-voltage circuit 101 and an over-current protection circuit 102.

The constant-voltage circuit 101 includes a reference voltage generating circuit 111 configured to generate and output a predetermined reference voltage Vref, an error amplification circuit AMP, an output transistor M101, and resistors R101 and R102, configured to generate and output a partial voltage VFB, which is obtained by dividing an output voltage Vo.

In addition, the over-current protection circuit 102 includes PMOS transistors M102, M103, M106, and M107; depletion-type NMOS transistors M104 and M105; a resistor R103, and a bias current source 112.

In the case when a current output from the output transistor M101 is smaller than a predetermined current value for exerting over-current protection, the drain current of the current detection transistor M2 is relatively small and the voltage drop by the resistor R103 becomes smaller than the sum of the partial voltage VFB at the junction between the resistors R101 and R102, and an offset voltage Vof. This makes the depletion-type NMOS transistor M105 turned off.

As a result, the gate voltage of the depletion-type NMOS transistor M105 is brought approximately to the input voltage Vin, the PMOS transistor M103 is turned off, and no over-current protection is performed.

When the current output from the output transistor M101 reaches the predetermined current value for exerting over-current protection, the voltage drop by the resistor R3 is brought to be equal to the sum of the partial voltage VFB and the offset voltage Vof.

As a result, the depletion-type NMOS transistor M105 is turned on, its drain voltage is decreased, and the PMOS transistor M103 is turned on.

By turning the PMOS transistor M103 on, the gate voltage of the output transistor M101 is elevated, the increase in the current output from the output transistor M101 is suppressed, and the output voltage Vo decreases.

Since the gate voltage of the depletion-type NMOS transistor M104 decreases with the decrease in the output voltage Vo, the over-current protection can be made operative for a small voltage drop by the resistor R3, and the output current io decreases with the decrease in the output voltage Vo.

When the output terminal OUT is short-circuited to the ground potential, the gate voltage of the depletion-type NMOS transistor M105 becomes equal to offset the voltage Vof.

During the short-circuit of the output terminal OUT, the magnitude of the current output from the output transistor M101 as the short-circuit current, is equal to the product of the current through the resistor R3 multiplied by the ratio of current between the output transistor M101 and the current detection transistor M102. That is, the magnitude of short-circuit current can be set by the values of the offset voltage Vof and the resistance of resistor R3.

In the abovementioned over-current protection circuit 102, however, the depletion-type NMOS transistor is used as an input component of the error amplification circuit in order to make the error amplification circuit operative at the voltages as small as approximately 0 (zero) V.

Since the depletion-type NMOS transistor has a gate voltage smaller than the source voltage in the range of small drain current, a certain degree of source voltage is required for the depletion-type NMOS transistor M104 or M105 even after the gate voltage of depletion-type NMOS transistor M104 is decreased to 0 V at short-circuit conditions.

Therefore, a difficulty with this over-current protection circuit is that the drain voltage of the depletion-type NMOS transistor M105 cannot be decreased to sufficiently low.

Along with the recent efforts to reduce power consumption in various equipments, circuit voltages also have been decreasing as typically evidenced by compact, portable electronic devices.

For example, the voltages input to the series regulated constant-voltage power circuits have been supplied recently with a minimum necessary voltage after processed once with a step-down DC-DC converter.

Moreover, the input voltage itself has shifted to as low as approximately 1.5 V, and problems are caused such as, for example, the gate voltage of PMOS transistor M103 cannot decrease low enough and this in turn brings the over-current protection circuit non-operative as long as the depletion-type NMOS transistor is used as the input component of the error amplification circuit, as mentioned earlier.

In order to address this problem and provide an over-current protection circuit capable of operating at low voltages, another known circuit is disclosed as illustrated in FIG. 4 (Japanese Laid-Open Patent Application No. 2004-118411, for example).

The components in the over-current protection circuit of FIG. 4 that are similar to those of the constant-voltage power supply circuit described earlier in reference to FIG. 3 are shown with identical numerical representations.

Referring to FIG. 4, the over-current protection circuit 100 includes PMOS transistors M112, M113, M114, and M115; an NMOS transistor M118; and resistors R113 and R114.

The PMOS transistors M112 serves as a current detection transistor, which is configured to output a current proportional to the output current from an output transistor M101.

The over-current protection circuit of FIG. 4 has a device structure similar to the constant-voltage power supply circuit of FIG. 3, with the exception that PMOS transistors M114 and M115 are included in the input circuit of error amplification circuit, and that the drain current of the detection transistor M112 serves as a bias current of the error amplification circuit.

The drain current of the detection transistor M112 is then distributed to PMOS transistors M114 and M115, and converted into a voltage with the resistor R113.

In the case when a current output from the output transistor M101 is smaller than a predetermined current value for exerting over-current protection, the drain current of the detection transistor M112 passes while evenly shared through PMOS transistors M114 and M115. Since the drain current is small, the voltage drop by the resistor R113 is also small.

As a result, the PMOS transistor M113 is turned off and no over-current protection is performed.

When the current output from the output transistor M101 reaches the predetermined current value for exerting over-current protection, the voltage drop by the resistor R113 reaches the threshold voltage of NMOS transistor M118 and the transistor is turned on.

By turning the NMOS transistor M118 on, the gate voltage of the PMOS transistor M113 decreases to be turned on, the gate voltage of the output transistor M101 is elevated. As a result, the increase in the current output from the output transistor M101 is suppressed and the output voltage Vo decreases.

Since the gate voltage of PMOS transistor M114 decreases along with the decrease in the output voltage Vo, the current through the PMOS transistor M114 and accordingly through the resistor R113 increases. The output current from the output transistor M101 decreases therefore with the decrease in the output voltage Vo.

However, a difficulty with the circuit configuration of FIG. 4 is that the output current from the output transistor M101 is one half of the output current maximum under short-circuit conditions, and it is not feasible for the value of output current be set arbitrarily.

SUMMARY OF THE INVENTION

Accordingly, it is an object of the invention to provide a constant-voltage power circuit having most, if not all, of the advantages and features of similarly employed power circuits, while reducing or eliminating many of the aforementioned disadvantages.

It is another object to provide a constant-voltage power circuit incorporating an over-current protection circuit having a fold back current limiting capability operative through low input voltages, and capable of arbitrarily setting the values of current output.

The following description is a synopsis of only selected features and attributes of the present disclosure. A more complete description thereof is found below in the section entitled "Description of the Preferred Embodiments."

The above and other objects of the invention are achieved by providing a constant-voltage power supply circuit configured to convert a voltage, which is input to an input terminal, into a predetermined constant voltage, and to output from an output terminal.

The constant-voltage power supply circuit includes at least an output transistor configured to output a current from the input terminal to the output terminal according to a signal input to a control electrode;

an output voltage control unit configured to generate the predetermined reference voltage, generate a voltage proportional to the voltage, amplify the difference between the predetermined reference voltage and the voltage proportional to the voltage to obtain an amplified difference, and input the amplified difference to the control electrode; and an over-current protection circuit configured to perform an control operation such that, in the case when the current output from the output terminal reaches a predetermined current value or greater for a rated output voltage, the first current as well as the first voltage are decreased, and that, in the case when the first voltage from the output terminal is decreased to a ground potential, a predetermined short-circuit current is output from the output terminal.

In addition, the over-current protection circuit includes at least (a) a current detection transistor configured to detect the current output from the output transistor, and to output a current proportional to the current input from the output transistor, (b) a current-voltage conversion circuit configured to convert the current output from the current detection transistor into a voltage to obtain a converted voltage;

(c) an error amplification circuit provided with first and second input terminals which are input with the current proportional to the current output from the output transistor and the converted voltage, respectively;

(d) an amplitude expander configured to expand an amplitude of the voltage output from the error amplification circuit, so as to range from the ground potential approximately to the input voltage; and (e) a control circuit configured to control an operation of the output transistor according to an output signal from the amplitude expander.

Moreover, the error amplification circuit is formed including an input circuit which is supplied with an offset voltage such that the value of the predetermined short-circuit current is obtained as positive.

With this device configuration, the constant-voltage power circuit of the invention is capable of performing over-current protection characterized by the fold back current limiting capability operative through low input voltages.

These and other features and advantages of the invention will be more clearly seen from the following detailed description of the invention which is provided in connection with the accompanying drawings.

BRIEF DESCRIPTION OF THE DRAWINGS

In the following drawings, like reference numerals will be used to refer to like elements, in which.

DETAILED DESCRIPTION OF PREFERRED EMBODIMENTS

Figure 1:
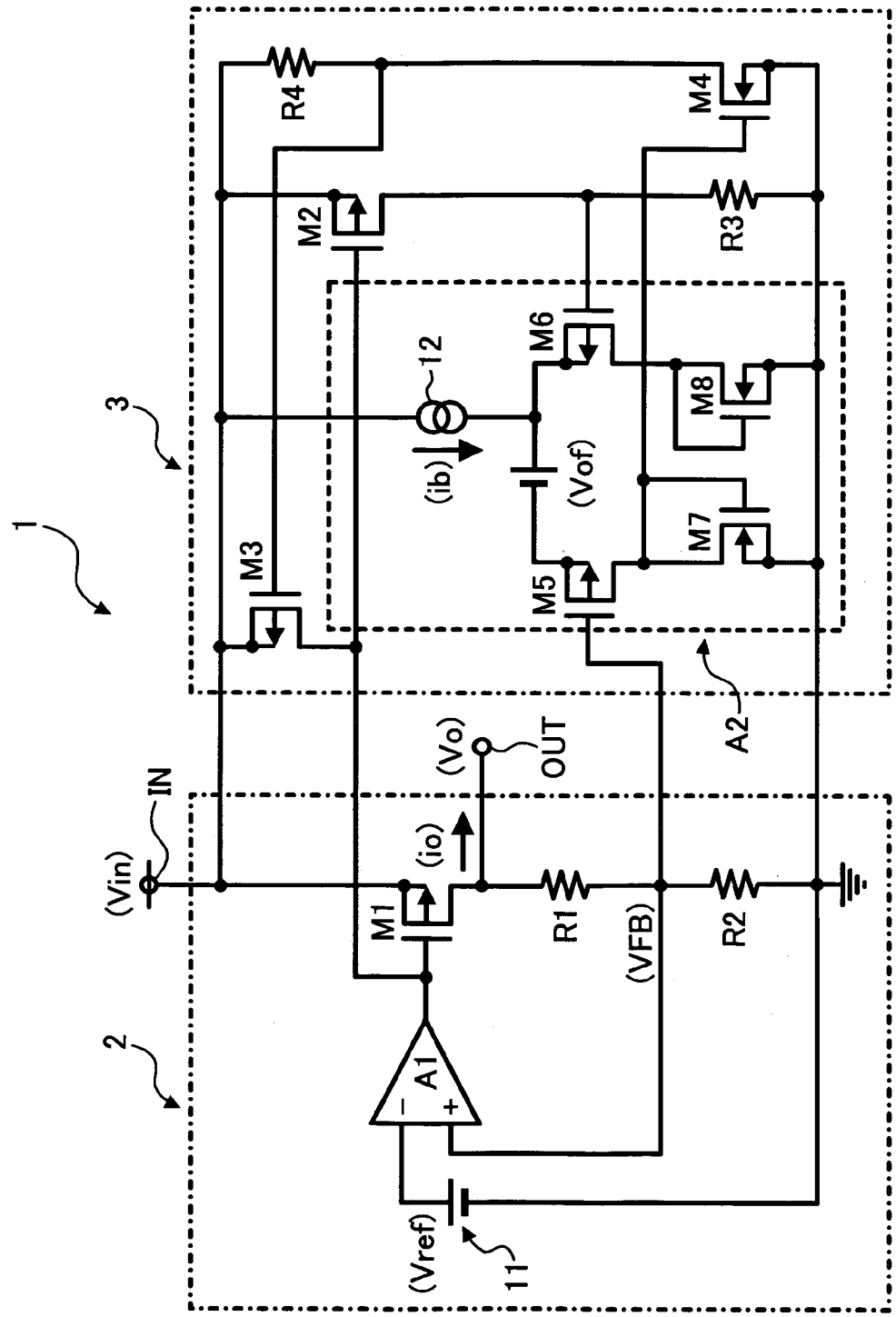
FIG. 1 is a diagrammatic circuit diagram illustrating a constant-voltage power supply circuit according to an exemplary embodiment of the invention.

In the detailed description which follows, specific embodiments are described on a constant-voltage power circuit incorporating an over-current protection circuit having a fold back current limiting capability.

It is understood, however, that the present disclosure is not limited to these embodiments. For example, it is appreciated that the present power circuit and its structure may also be adaptable to various circuits. Other embodiments will be apparent to those skilled in the art upon reading the following description.

In addition, in the description that follows specific terminology is used in many instances for the sake of clarity. However, the disclosure of this patent specification is not intended to be limited to the specific terminology so selected and it is to be understood that each specific element includes all technical equivalents that operate in a similar manner.

According to a general example in the present disclosure, a constant-voltage power circuit incorporating an over-current protection circuit is provided, being configured to convert a voltage which is input to an input terminal, into a predetermined constant voltage, and to output from an output terminal.

The constant-voltage power supply circuit may include at least an output transistor, an output voltage control unit, and an over-current protection circuit.

The output transistor is configured to output a first current from the input terminal to the output terminal according to a signal input to a control electrode.

The output voltage control unit is configured to generate the predetermined reference voltage, generate a second voltage proportional to the first voltage, amplify the difference between the predetermined reference voltage and the second voltage proportional to the first voltage to thereby obtain an amplified difference, and input the amplified difference to the control electrode.

The over-current protection circuit is configured to perform an control operation such that, in the case when the first current output from the output terminal reaches a predetermined current value or greater for a rated output voltage, the first current as well as the first voltage are decreased, and that, in the case when the first voltage from the output terminal is decreased to a ground potential, a predetermined short-circuit current is output from the output terminal.

In addition, the over-current protection circuit includes at least (a) a current detection transistor configured to detect the first current from the output transistor, and to output a second current proportional to the first current input from the output transistor, in which a control electrode of the current detection transistor is connected to the control electrode of the output transistor and a current input terminal of the current detection transistor is connected to the input terminal as well as the output transistor, (b) a current-voltage conversion circuit configured to convert the second current from the current detection transistor into a third voltage to obtain a converted voltage;

(c) an error amplification circuit provided with first and second input terminals which are input with the second current proportional to the first current output from the output transistor and the converted voltage, respectively;

(d) an amplitude expander configured to expand the amplitude of a fourth voltage output from the error amplification circuit, so as to range from the ground potential approximately to the input voltage; and (e) a control circuit configured to control an operation of the output transistor according to an output signal from the amplitude expander.

Specifically, input and output terminals of the amplitude expander are connected to corresponding terminals of the error amplification circuit and the control circuit, respectively, to thereby form an inverter circuit.

In addition, the error amplification circuit includes first and second transistors, which form first and second halves of a differential pair, to thereby form first and second diodes as first and second loads of the first and second transistors, respectively.

Still in addition, the amplitude expander includes (i) a third transistor configured to form a first current mirror circuit in combination with the first transistor, in which the control electrode of the first transistor is input with the second current proportional to the first current, (ii) a fourth transistor configured to form a second current mirror circuit in combination with the second transistor, in which an control electrode of the second transistor is input with the converted voltage; and (iii) a third current mirror circuit configured to supply a third current from the fourth transistor to the third transistor.

In addition, the control circuit is configured to control an operation of the output transistor according to a fifth voltage at the junction between the third transistor and the third current mirror circuit.

Moreover, the error amplification circuit is formed including an input circuit which is supplied with an offset voltage such that the predetermined short-circuit current is obtained as a positive value.

Having described the present disclosure in general, several preferred embodiments of the constant-voltage power supply circuit will be described herein below according to the present invention with reference to FIGS. 1 and 2.

FIG. 1 is a diagrammatic circuit diagram illustrating a constant-voltage power supply circuit according to a first embodiment disclosed herein.

Referring to FIG. 1, a constant-voltage power supply circuit 1 is configured to convert an input voltage Vin, which is input to an input terminal IN, into a predetermined constant voltage, and subsequently output as an output voltage Vo from an output terminal OUT.

The constant-voltage power supply circuit 1 may be integrated to be a single IC (integrated circuit) device.

The constant-voltage power supply circuit 1 includes at least a constant-voltage circuit 2 configured to convert an input voltage Vin into a predetermined constant voltage to subsequently be output as an output voltage Vo from an output terminal OUT, and an over-current protection circuit 3 configured to have a fold back current limiting capability, in that this current limiting capability is characterized by the function of the protection circuit 3 such that, in the case when an output current io, which is output from the output terminal OUT, is equal to or larger than a predetermined value of over-current protection current, the output current io is controlled to be suitably suppressed by decreasing the output voltage Vo.

The constant-voltage circuit 2 includes a reference voltage generating circuit 11 configured to generate and output a predetermined reference voltage Vref; resistors R1 and R2 for use in detecting output voltages, configured to generate and output a partial voltage VFB which is obtained by dividing the output voltage Vo; an output transistor M1, consisting of a PMOS transistor, configured to control a current output io to the output terminal OUT according to a signal input to a gate; and an error amplification circuit A1 configured to control the operation of the output transistor M1 such that the partial voltage VFB is equal to the reference voltage Vref.

The over-current protection circuit 3 includes a differential amplifier circuit A2, PMOS transistors M2 and M3, an NMOS transistor M4, and resistors R3 and R4.

In addition, the differential amplifier circuit A2 includes PMOS transistors M5 and M6, NMOS transistors M7 and M8, and a constant current source 12.

In this structure, the error amplification circuit A1, reference voltage generating circuit 11, and resistors R1 and R2 constitute an output voltage control unit. And, the PMOS transistor M2 serves as a current detection transistor, the resistor R3 as a current-voltage conversion circuit, and the NMOS transistor M4 and resistor R4 as an amplitude expander, respectively.

In the constant-voltage circuit 2, the output transistor M1 is connected between the input terminal IN and the output terminal OUT, and the resistors R1 and R2 are connected serially between the output terminal OUT and the ground.

In the error amplification circuit A1, the gate of PMOS transistor M1 is connected to the output terminal, the partial voltage VFB is input to the non-inverting terminal, and the reference voltage Vref is input to the inverting terminal.

In the over-current protection circuit 3, the source of PMOS transistor M2 is connected to the input terminal IN, and the gate of PMOS transistor M2 is connected to the gate of the output transistor M1.

In addition, the resistors R3 is connected between the drain of PMOS transistor M2 and the ground, and the joint of PMOS transistor M2 and the resistors R4 is connected to the gate of PMOS transistor M6 as one input of the differential amplifier circuit A2.

Still in addition, the resistor R4 and NMOS transistor M4 are connected serially between the input terminal IN and the ground; and the output of the differential amplifier circuit A2, i.e., the joint of PMOS transistor M5 and NMOS transistor M7, is connected to the of NMOS transistor M4; and the partial voltage VFB is input to the other input of the differential amplifier circuit A2.

Moreover, the PMOS transistor M3 is connected between the input terminal IN and the output transistor M1, and the gate of PMOS transistor M3 is connected to the joint of the resistor R4 and NMOS transistor M4.

The sources of PMOS transistors M5 and M6, as a differential pair, are interconnected, and the constant current source 12 is connected between the joint of the differential pair and the input terminal IN.

The gates of NMOS transistors M7 and M8 are interconnected and the joint thereof is connected to the drain of NMOS transistor M8, whereby a current mirror circuit is formed. The sources of NMOS transistors M7 and M8 are each connected to the ground, the drain of NMOS transistor M7 is connected to the drain of PMOS transistor M5 and the joint thereof serves as the output terminal of the differential amplifier circuit A2. In addition, the drain of NMOS transistor M8 is connected to the drain of PMOS transistor M6.

The voltage Vof applied to the source of PMOS transistor M5 is indicative of an offset voltage at the differential pair constituted of PMOS transistors M5 and M6.

It may be added that the method of forming the offset voltage Vof is not necessarily limited to the abovementioned method, but may alternatively be selected from several known methods such as, for example, one with different device size of the PMOS transistors M5 and M6.

With the abovementioned device configuration, the error amplification circuit A1 controls so that the partial voltage VFB coincides to the reference voltage Vref.

In the case when the output current io is smaller than a predetermined current value for exerting over-current protection, the drain current of the current detection transistor M2 is relatively small and the voltage drop by the resistor R3 becomes smaller than the sum of the reference voltage Vref and the offset voltage Vof.

As a result, PMOS transistor M6 is turned on and PMOS transistor M5 is turned off, this brings the drain voltage of PMOS transistor M5 to approximately the ground potential.

Since NMOS transistor M4 is turned off and the drain voltage of PMOS transistor M4, i.e., the gate voltage of PMOS transistor M3, is brought approximately to the input voltage Vin, PMOS transistor M3 is turned off and no over-current protection is performed.

By contrast, when the output current io increases to be equal to, or larger than, the predetermined current value for exerting over-current protection, the voltage drop by the resistor R3 is brought to be equal to the sum of the reference voltage Vref and the offset voltage Vof. As a result, the drain voltage of PMOS transistor M5 increases and NMOS transistor M4 is turned on.

Since the source of NMOS transistor M4 is grounded, its drain voltage can be decreased to approximately the ground potential. Therefore, PMOS transistor M3 can be sufficiently turned on even at low values of the input voltage Vin.

By turning the PMOS transistor M3 on, the gate voltage of the output transistor M1 decreases, the increase in output current io is suppressed, and the output voltage Vo decreases.

Since the gate voltage of the PMOS transistor M5 decreases along with the decrease in the output voltage Vo, the over-current protection can be made operative for a small voltage drop by the resistor R3, and the output current io decreases with the decrease in the output voltage Vo.

When the output terminal OUT is short-circuited to the ground potential, the gate voltage of the PMOS transistor M6 becomes equal to offset the voltage Vof.

During the short-circuit of the output terminal OUT, the magnitude of the output current io is equal to the product of the current through the resistor R3 multiplied by the ratio of current between the output transistor M1 and the current detection transistor M2. That is, the magnitude of short-circuit current can be set by the values of the resistance of resistor R3 and the offset voltage Vof.

Moreover, as described earlier, the amplitude of the drain voltage of the PMOS transistor M5, as the output voltage of the differential amplifier circuit A2, is subjected to amplitude (or, magnitude) expansion so as to range from the ground potential to input voltage Vin by means of an inverter consisting of the NMOS transistor M4 and resistor R4.

As a result, the ON/OFF control of PMOS transistor M3 becomes feasible at low values of the input voltage Vin and the over-current protection can be performed by controlling the output transistor M1.

Although the resistor R4 is used as the load of the NMOS transistor M4 in FIG. 1, a constant current source may alternatively be used instead.

As describe herein above, the constant-voltage power supply circuit according to the present embodiment is configured such that a voltage output with small amplitude from the differential amplifier circuit A2 is subjected to the amplitude expansion to be amplified to range fully from the ground potential approximately to the input voltage Vin by means of the inverter consisting of the NMOS transistor M4 and resistor R4, and that the resulting voltage is subsequently input to the gate of PMOS transistor M3 which is capable of directly controlling the output transistor M1.

Accordingly, the ON/OFF control of PMOS transistor M3 becomes feasible at low input voltage Vin and the over-current protection can be performed through the control of the output transistor M1.

Figure 2:
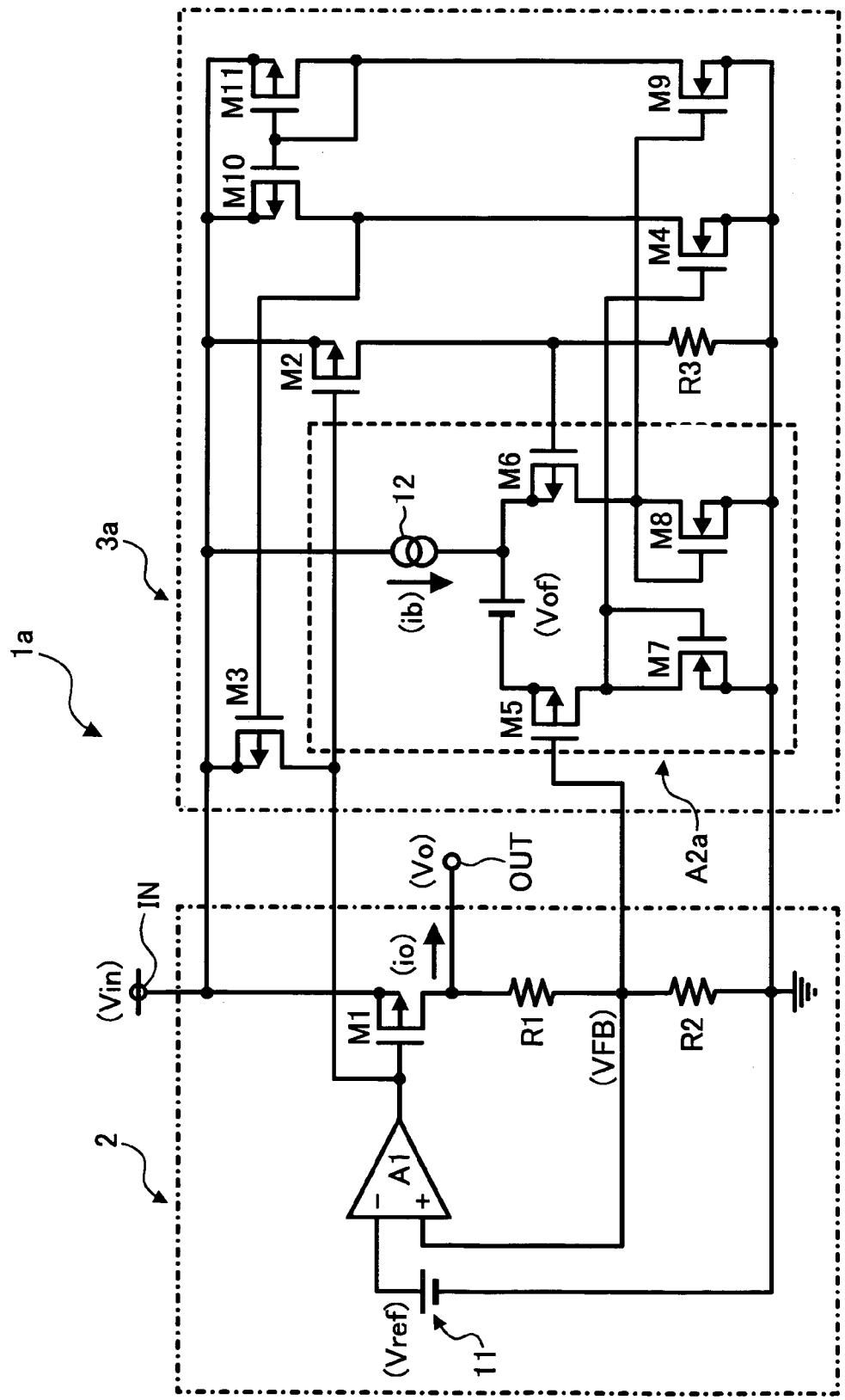
FIG. 2 is a diagrammatic circuit diagram illustrating a constant-voltage power supply circuit according to another exemplary embodiment of the invention.
Figure 3:
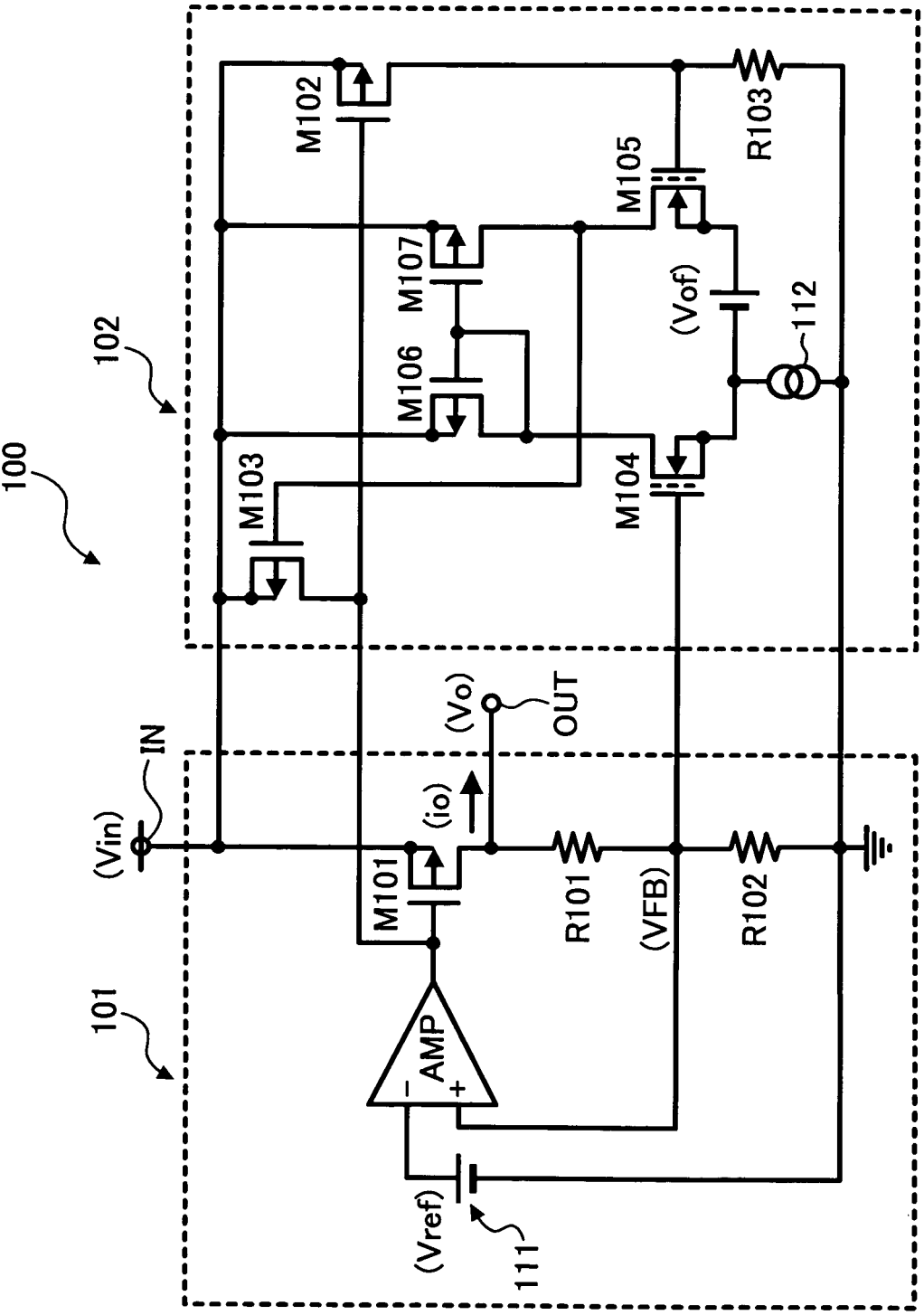
FIG. 3 is a diagrammatic circuit diagram illustrating a known constant-voltage power supply circuit incorporating an overcurrent protection circuit.
Figure 4:
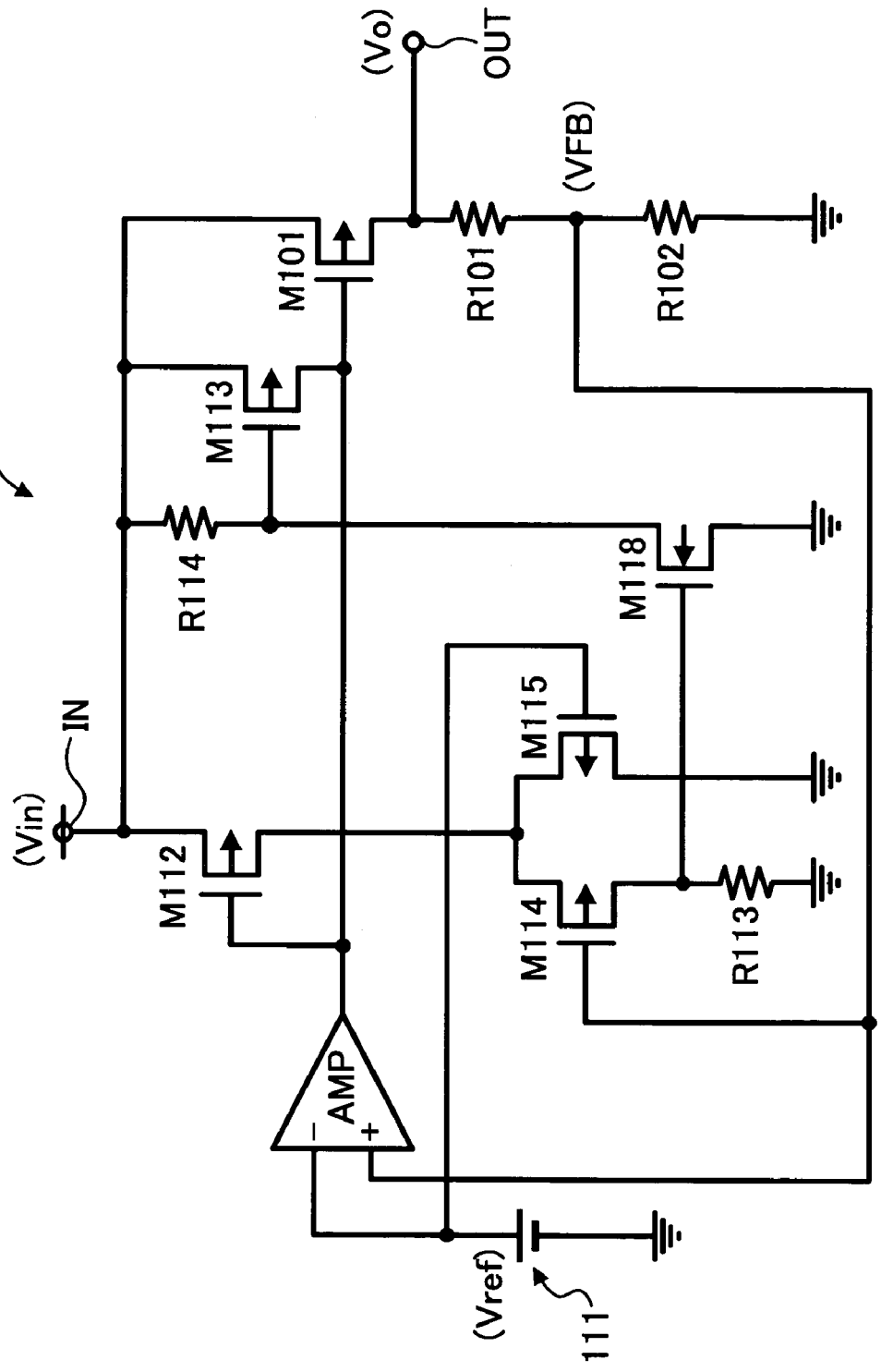
FIG. 4 is a diagrammatic circuit diagram illustrating a known over-current protection circuit.

FIG. 2 is a diagrammatic circuit diagram illustrating a constant-voltage power supply circuit according to a second embodiment disclosed herein.

The components in the constant-voltage power supply circuit of FIG. 2 that are similar to those of the power supply circuit described earlier in reference to FIG. 1 are shown with identical numerical representations, and the description thereof is herein abbreviated for purposes of clarity.

The constant-voltage power supply circuit of FIG. 2 has a device structure similar to the power supply circuit of FIG. 1, with the exception that the resistor R4 of FIG. 1 is eliminated, and that NMOS transistors M9 and PMOS transistors M10 and M11 are appended, whereby NMOS transistors M7 and M4 constitutes a current mirror circuit and NMOS transistors M8 and M9 constitutes a further current mirror circuit.

Accordingly, there shown in FIG. 2 are a constant-voltage power supply circuit 1a and an over-current protection circuit 3a in place of the constant-voltage power supply circuit 1 and an over-current protection circuit 3 of FIG. 1, respectively.

Referring to FIG. 2, the constant-voltage power supply circuit 1a is configured to convert an input voltage Vin input to an input terminal IN, into a predetermined constant voltage, and subsequently output as an output voltage Vo from an output terminal OUT. The constant-voltage power supply circuit 1a may be integrated to be a single IC device.

The constant-voltage power supply circuit 1a includes at least a constant-voltage circuit 2, and an over-current protection circuit 3a configured to have the fold back current limiting capability, in that the current limiting capability is characterized by the function of the protection circuit 3a such that, in the case when an output current io, which is output from the output terminal OUT, is equal to or larger than a predetermined value of over-current protection current, the output current io is controlled to be suitably suppressed by decreasing the output voltage Vo.

The over-current protection circuit 3a includes a differential amplifier circuit A2a, PMOS transistors M2, M3, M10, and M11, NMOS transistors M4 and M9, and a resistor R3.

In addition, the differential amplifier circuit A2a includes PMOS transistors M5 and M6, NMOS transistors M7 and M8, and a constant current source 12.

Still in addition, NMOS transistor M4 constitutes a first transistor, NMOS transistor M9 a second transistor, NMOS transistors M7 and M4 a first current mirror circuit, NMOS transistors M8 and M9 a second current mirror circuit, and PMOS transistors M10 and M11 a third current mirror circuit, respectively.

In respect to the over-current protection circuit 3a, the sources of PMOS transistors M5 and M6, as a differential pair, are interconnected, and the constant current source 12 is connected between the joint of the differential pair and the input terminal IN.

NMOS transistors M7 is connected between the drain of PMOS transistor M5 and the ground, and the gate and drain of NMOS transistors M7 are interconnected, whereby a diode is formed. Similarly, NMOS transistors M8 is connected between the drain of PMOS transistor M6 and the ground, and the gate and drain of NMOS transistors M8 are interconnected, whereby a further diode is formed.

The joint between the drain of NMOS transistor M7 and the drain of PMOS transistor M5 serves as one of output terminals of the differential amplifier circuit A2a, and is connected to the gate of NMOS transistor M4.

In addition, the joint between the drain of PMOS transistor M6 and the drain of NMOS transistor M8 serves as the other output terminal of the differential amplifier circuit A2a, and is connected to the gate of NMOS transistor M9.

There connected serially between the input terminal IN are PMOS transistors M10 and NMOS transistors M4, and also PMOS transistor M11 and NMOS transistor M9. The third current mirror circuit is formed consisting of PMOS transistors M10 and M11, in which the gates thereof are interconnected to form a joint, and which the joint is connected to the drain of PMOS transistor M11.

In addition, the joint between PMOS transistors M10 and NMOS transistor M4 is connected to the gate of PMOS transistors M3.

When the output current io is smaller than a predetermined current value for exerting over-current protection with the abovementioned device configuration, the drain current of the current detection transistor M2 is relatively small and the voltage drop by the resistor R3 becomes smaller than the sum of the reference voltage Vref and the offset voltage Vof.

As a result, PMOS transistor M6 is turned on while PMOS transistors M5 is off, whereby the bias current ib from the constant current source 12 is supplied entirely as the drain current for PMOS transistors M5. This drain current for PMOS transistors M5 is transformed to that for NMOS transistor M9 by way of NMOS transistor M8.

Namely, since the drain current of NMOS transistor M9 is large while that of NMOS transistor M4 is minimal, the drain voltage of NMOS transistor M4 is brought approximately equal to the input voltage Vin. As a result, PMOS transistor M3 is turned off and no over-current protection is performed.

By contrast, when the output current io increases to be equal to, or larger than, the predetermined current value for exerting over-current protection, the voltage drop by the resistor R3 is brought to be equal to the sum of the reference voltage Vref and the offset voltage Vof. Then, the drain current of PMOS transistor M5 increases and its drain voltage decreases.

As a result, the drain voltage of NMOS transistor M4 increases and its drain voltage decreases.

Since the source of NMOS transistor M4 is grounded, its drain voltage can be decreased to approximately the ground potential, and PMOS transistor M3 can be sufficiently turned on even at low values of the input voltage Vin, as a result.

By turning the PMOS transistor M3 on, the gate voltage of the output transistor M1 is elevated, the increase in output current io is suppressed, and the output voltage Vo decreases.

Since the gate voltage of the PMOS transistor M5 also decreases along with the decrease in the output voltage Vo, the over-current protection can be made operative for a small voltage drop by the resistor R3, and the output current io decreases with the decrease in the output voltage Vo.

Incidentally, the output current io at the output voltage Vo zero, i.e., short-circuit current, can be set in a manner similar to the method described earlier in reference to FIG. 1.

As describe herein above, the constant-voltage power supply circuit according to the second embodiment is configured such that a voltage output with small amplitude from the differential amplifier circuit A2a is subjected to the amplitude expansion to be amplified so as to range fully from the ground potential approximately to the input voltage Vin by means of the inverter consisting of NMOS transistors M4 and M9 and PMOS transistors M10 and M11, and that the resulting voltage is subsequently input to the gate of PMOS transistor M3 which is capable of directly controlling the output transistor M1.

Accordingly, the ON/OFF control of PMOS transistor M3 becomes feasible at low input voltage Vin and the over-current protection circuit can be operated properly through the control of the output transistor M1.

Moreover, since the over-current protection circuit can be obtained in the second embodiment having a gain smaller the first embodiment, the present circuit has a higher stability and can be operated stably in the configuration of simple phase compensation circuit.

In addition, the partial voltage VFB has been adapted to be input to the gate of PMOS transistor M5 in both the first and second embodiments.

However, since it is sufficient for a voltage proportional to the output voltage Vo to be input to that gate, the circuit may alternatively be constructed such that another circuit is additionally formed for generating a voltage proportional to the output voltage Vo, and that a resulting proportional voltage is input to the gate of PMOS transistor M5.

It is apparent from the above description including the examples disclosed that the constant-voltage power circuit of the invention can offer several advantages over similar power circuits previously known.

For example, the present constant-voltage power supply circuit is configured such that a voltage output with small amplitude from the differential amplifier circuit is subjected to the amplitude expansion to be amplified to range fully from the ground potential approximately to the input voltage by the inverter and PMOS transistors, and that the resulting voltage is subsequently input to the gate of one of the PMOS transistors which is capable of directly controlling the output transistor.

As a result, the over-current protection can be attained securely in a predetermined way even through low input voltages.

In addition, since the magnitude of the output current under short-circuit conditions is equal to the product of the current through the resistor for current-voltage conversion circuit multiplied by the ratio of current between the output transistor and the current detection transistor, the magnitude of short-circuit current can be set by the values of the resistance of the resistor and the offset voltage.

Together with the input circuit provided with offset voltages, therefore, the magnitude of short-circuit current can be adjusted with relative ease in the present constant-voltage power supply circuit.

Still in addition, since the over-current protection circuit can be obtained in the abovementioned second embodiment having a gain smaller the first embodiment, the former circuit has a higher stability and can be operated stably in the configuration of simple phase compensation circuit.

The fabrication of the constant-voltage power supply circuit set forth in the present description may be implemented using conventional general purpose microprocessors, programmed according to the teachings in the present specification, as will be appreciated to those skilled in the relevant arts. Appropriate software coding can readily be prepared by skilled programmers based on the teachings of the present disclosure, as will also be apparent to those skilled in the relevant arts.

The present specification thus include also a computer-based product which may be hosted on a storage medium, and include instructions which can be used to program a microprocessor to perform a process in accordance with the present disclosure. This storage medium can include, but not limited to, any type of disc including floppy discs, optical discs, CD-ROMs, magneto-optical discs, ROMs, RAMs, EPROMs, EEPROMs, flash memory, magnetic or optical cards, or any type of media suitable for storing electronic instructions.

While the invention has been described in conjunction with the preferred embodiments, including specific device components, and configurations, it is evident that many alternatives and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A constant-voltage power supply circuit configured to perform at least a first operation to input an input voltage to an input terminal, a second operation to convert said input voltage into a predetermined constant voltage, and a third operation to output said predetermined constant voltage as a first voltage output from an output terminal, comprising:

an output transistor configured to output a first current from said input terminal to said output terminal according to a signal input to a control electrode;

an output voltage control unit configured to perform a fourth operation to generate said predetermined reference voltage, a fifth operation to generate a second voltage proportional to said first voltage, a sixth operation to amplify a difference between said predetermined reference voltage and said second voltage proportional to said first voltage to obtain an amplified difference, and a seventh operation to input said amplified difference to said control electrode;

an over-current protection circuit configured to perform a first control operation on said output transistor, in a case when said first current from said output terminal reaches a predetermined current value or greater for a rated output voltage, to decrease said first current as well as said first voltage; and a second control operation on said output transistor, in a case when said first voltage from said output terminal is decreased to a ground potential, to output a predetermined short-circuit current from said output terminal;

said over-current protection circuit comprising (a) a current detection transistor configured to perform an eighth operation to detect said first current from said output transistor, and a ninth operation to output a second current proportional to said first current from said output transistor, a control electrode of said current detection transistor being connected to the control electrode of said output transistor, a current input terminal of said current detection transistor being connected to said input terminal as well as said output transistor;

(b) a current-voltage conversion circuit configured to convert said second current from said current detection transistor into a third voltage to obtain a converted voltage;

(c) an error amplification circuit, first and second input terminals of said error amplification circuit being input with said second current proportional to said first current output from said output transistor and said converted voltage, respectively;

(d) an amplitude expander configured to expand an amplitude of a fourth voltage output from said error amplification circuit, so as to range from the ground potential approximately to said input voltage; and (e) a control circuit configured to control an operation of said output transistor according to an output signal from said amplitude expander.

2. The constant-voltage power supply circuit according to claim 1, wherein input and output terminals of said amplitude expander are connected to a corresponding terminal of said error amplification circuit and said control circuit, respectively, to thereby form an inverter circuit.

3. The constant-voltage power supply circuit according to claim 1,
said error amplification circuit comprising
first and second transistors configured to form first and second halves of a differential pair to thereby form first and second diodes as first and second loads of said first and second transistors, respectively;
said amplitude expander comprising
(i) a third transistor to form a first current mirror circuit in combination with said first transistor, an control electrode of said first transistor being input with said second current proportional to said first current;
(ii) a fourth transistor to form a second current mirror circuit in combination with said second transistor, an control electrode of said second transistor being input with said converted voltage; and
(iii) a third current mirror circuit configured to supply a third current from said fourth transistor to said third transistor,
wherein said control circuit is configured to control an operation of said output transistor according to a fifth voltage at a junction between said third transistor and said third current mirror circuit.

4. The constant-voltage power supply circuit according to claim 1, wherein said error amplification circuit includes an input circuit, said input circuit being provided with an offset voltage such that a value of said predetermined short-circuit current is obtained as positive.

5. The constant-voltage power supply circuit according to claim 1, wherein said error amplification circuit includes an input circuit, said input circuit being provided with an offset voltage such that a value of said predetermined short-circuit current is obtained as positive.

6. The constant-voltage power supply circuit according to claim 1, wherein said error amplification circuit includes an input circuit, said input circuit being provided with an offset voltage such that a value of said predetermined short-circuit current is obtained as positive.

7. A constant-voltage power supply circuit configured to perform at least a first operation to input an input voltage to an input terminal, a second operation to convert said input voltage into a predetermined constant voltage, and a third operation to output said predetermined constant voltage as a first voltage output from an output terminal, comprising:

means for outputting a first current from said input terminal to said output terminal according to a signal input to a control electrode;

means for generating said predetermined reference voltage, generating a second voltage proportional to said first voltage, amplifying a difference between said predetermined reference voltage and said second voltage proportional to said first voltage to obtain an amplified difference, and inputting said amplified difference to said control electrode; and over-current protection means, including
first controlling means for controlling said means for outputting, in a case when said first current from said output terminal reaches a predetermined current value or greater for a rated output voltage, to decrease said first current as well as said first voltage;
second controlling means for controlling said means for outputting, in a case when said first voltage from said output terminal is decreased to a ground potential, to output a predetermined short-circuit current from said output terminal;
means for detecting said first current from said output transistor;
means for outputting a second current proportional to said first current from said output transistor;
means for converting said second current from said current detection transistor into a third voltage to obtain a converted voltage;
error amplification means;
amplitude expander means for expanding an amplitude of a fourth voltage output from said error amplification means to range from the ground potential approximately to said input voltage; and
third control means for controlling an operation of said means for outputting according to an output signal from said amplitude expander mean.

8. The constant-voltage power supply circuit according to claim 7, wherein said error amplification means includes input means, said input means being provided with an offset voltage such that a value of said predetermined short-circuit current is obtained as positive.

* * * * *